April 15, 1930. A. R. THOMPSON Re. 17,643
HEAT TREATING APPARATUS FOR PACKAGED GOODS
Original Filed June 7, 1921
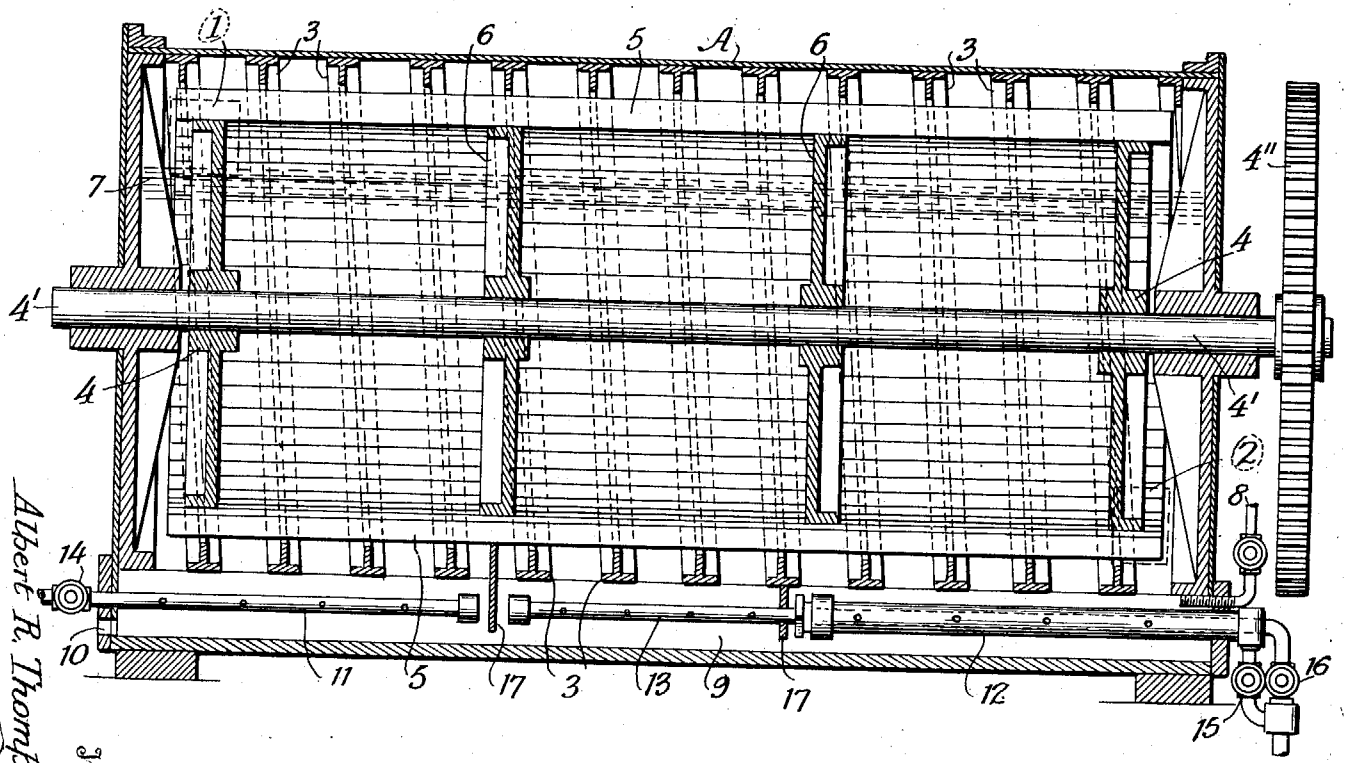
Inventor
Albert R. Thompson,
By Alexander Powell
Attorneys Reissued Apr. 15, 1930

Re. 17,643

UNITED STATES PATENT OFFICE

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA

HEAT-TREATING APPARATUS FOR PACKAGED GOODS

Original application filed June 7, 1921, Serial No. 475,643. Divided and application filed May 16, 1923, Serial No. 639,438. Original No. 1,498,765, dated June 24, 1924. Application for reissue filed December 10, 1924. Serial No. 755,118.

This application is a continuation in part of my pending application, Serial Number 475,643, filed June 7, 1921, for a patent for method of processing milk.

My invention relates to apparatus for heat-treating packaged goods, and while specially adapted for use in the processing of milk according to the method described in the application above identified, is also adapted for the treatment of other comestibles, particularly as a cooker in the canning art, in which it is necessary to subject the goods according to their nature, to the cooking heat during varying time periods.

The variable time period in cookers of this type is commonly effected in one of two ways, namely, either by varying the speed of the carrier which advances the goods through the treating chamber, or by varying the length of the path pursued by the goods. Cookers are also known, especially of the pressure type, in which the goods are carried through successive compartments, in which the temperature varies one from the other. In such machines it is obvious that if the temperature in one compartment or zone be so reduced as to fail of cooking function the time of cook would be proportionately varied. It is to this idea in addition to its function as a step in the method of processing milk disclosed in my former application of which this is a continuation in part, that my invention is directed, and to the end that it may be conveniently and effectively embodied in a practical device my invention consists in the novel apparatus for heat-treating packaged goods which I shall hereinafter fully describe by reference to the accompanying drawings, in which the figure is a longitudinal vertical section of my apparatus.

In the following description, I shall, for the sake of simplicity refer to the packaged goods as cans.

A is a shell provided with a can inlet 1 and a can outlet 2. Within the shell, around its inner circumference is a fixed, helically directed rail or spirally trending member 3 which forms one member of a can track. The other member is a rotatable reel or rotary carrier 4, carrying a peripheral series of spaced rails 5 parallel with the reel axis and lying in such proximity to the fixed, helically directed rail as to form therewith a support for the cans, said rails 3 and 5 coacting to produce a helical path through which a procession or stream of cans is continuously advanced from the inlet 1 to the outlet 2, in a manner common to and well known in the art. The reel 4 extends through the spirally trending member 3 and has a shaft 4′ for rotating it, the shaft being driven by a gear 4″, or other suitable means.

Upon the shaft 4′ and rotating with it are the spaced cross-plates or partitions 6 lying between the end heads of the reel. These plates may be in any suitable number, two being here shown, dividing the shell into three successive compartments or heat zones, said plates or partitions forming part of and moving with the carrier or reel 3. Said plates are imperforate, but as will be seen the several compartments peripherally communicate through the continuous can-track formed by the rails 3 and 5, but as this track is, in operation, filled with cans, the communication is but slight, and this, taken in connection with the imperforate cross plates 6 renders it possible, in practice, to give to and maintain in each compartment a different temperature degree without appreciable interchange.

The heating medium is preferably by water, indicated by 7. This is supplied by a pipe 8, and is drained off when necessary through a bottom chamber 9 and a drain 10. The water is heated by steam admitted through perforated pipes. For example, one steam pipe 11 enters and is housed in the underlying drain chamber 9 and lies below the first compartment or zone. Another steam pipe 12 lies in the chamber 9 below the third compartment or zone, and still another steam pipe 13, conveniently passing through the steam pipe 12, lies in the chamber 9 below the second compartment or zone. Each of these pipes is independently controlled as to the volume of steam admitted, in accordance with the temperature desired in each compartment. For this purpose I have shown the cocks 14, 15 and 16 respectively. Thus a different temperature may be maintained in each compartment of the shell A, or the steam may be cut off from one or more compartments as desired.

In order to further guard against appreciable interchange of heat between the compartments or zones there are division plates 17 depending from the bottom of the shell into the chamber 9.

The function of this apparatus, in processing milk contained in hermetically sealed cans is that of a pre-heater. For example the cans are subjected in the first compartment or zone to a temperature of about 70° F.; in the second compartment or zone, to a temperature of about 120° F.; and in the third compartment or zone to a temperature of about 180° F.

In using the apparatus as a variable time cooker, the operation is as follows:—

If the goods are of a nature to require the longest time of cook, all the compartments are given a cooking temperature, and the cans are passed through the whole length of the shell from inlet to outlet by and during the rotating of the reel or carrier, during which movement they are subjected for the full time of their travel to said temperature.

But if the goods require a shorter time to cook, the temperature of the first compartment is either reduced below that required for cooking or the steam to said compartment is cut off completely, while the temperature of the second and third compartments is maintained at the degree required for cooking. Therefore, though the cans enter at the inlet 2 and pass through the first compartment, they are not exposed to a cooking temperature therein but they are so exposed in the succeeding compartments, and the time of cook is thus shortened. Likewise the very shortest cook may be had by cutting off the steam from the first and second compartments and permitting the cooking in the third compartment only.

It should be noted that the cross-plates 6 separating the compartments are part of and rotate with the reel or carrier 4. They do not, therefore, present any obstruction to the continuity of the can path, as non-rotating or fixed partitions would, which latter would require special features of the track to enable the cans to pass over them. In the present device the can track is uniform throughout but when filled with cans, the interchange of heat is negligible.

I claim:

1. An apparatus for heat treating packaged goods comprising a heating shell having an inlet and an outlet; a helically directed fixed rail within the shell about the inner surface of its periphery; a rotatable reel within the shell having a peripheral series of rails parallel with the reel axis and coacting with the helically directed rail to form a path for conducting the goods through the shell from the inlet to the outlet; an imperforate cross plate carried by and within the reel and rotating therewith, said plate dividing the reel into successive compartments communicating through the goods path; and means for maintaining different temperatures in each compartment.

2. An apparatus for heat treating packaged goods comprising a heating shell having an inlet and an outlet; a helically directed fixed rail within the shell about the inner surface of its periphery; a rotatable reel within the shell having a peripheral series of rails parallel with the reel axis and coacting with the helically directed rail to form a path for conducting the goods through the shell from the inlet to the outlet; an imperforate cross plate carried by and within the reel and rotating therewith, said plate dividing the reel into successive compartments communicating through the goods path; and means for maintaining different temperatures in each compartment, consisting of separately controllable steam pipes.

3. An apparatus for heat-treating packaged goods comprising a heating shell having an inlet and an outlet; a helically directed fixed rail within the shell about the inner surface of its periphery; a rotatable reel within the shell having a peripheral series of rails parallel with the reel axis and coacting with the helically directed rail to form a path for conducting the goods through the shell from the inlet to the outlet; an imperforate cross plate carried by and within the reel and rotating therewith, said plate dividing the reel into successive compartments communicating through the goods path; a drain chamber underlying and communicating with the shell and separately controllable steam pipes housed within said drain chamber and adapted to supply steam to said compartments respectively.

4. A continuous cooker, comprising a horizontally extending tank having inlet and outlet openings and zones of various degrees of heat, a single spirally trending member extending through said heat zones, and a single rotary carrier extending through the spirally trending member and coacting therewith for moving cans and having means forming part of and moving with the carrier for preserving the heat zones.

5. A continuous cooker, comprising a horizontally extending tank having inlet and outlet openings and zones of various degrees of heat for cooking food in cans passed therethrough, means controlling the temperature of said zones, a spirally trending member extending through said heat zones, and a rotary carrier extending through the spirally trending member and co-acting therewith for moving cans from the inlet opening through the heat zones and to the outlet opening and having means forming part of and moving with the carrier for preserving the heat zones.

6. An automatic cooker, comprising a horizontal tank of comparatively considerable depth having a plurality of heating zones of different degrees of heat, a single means for moving cans of food through said tank at a constant speed and in the same continuous path, said can moving means also carrying partitions for maintaining predetermined temperatures in the different compartments, and means controlling the temperature of the heat zones to vary the degree of cooking of different kinds of food in the cans.

7. In combination a tank having inlet and outlet openings, a spiral canway in said tank, and a rotary reel within the spiral canway and coacting therewith for moving cans therethrough and partitions within and moving with the reel for dividing the interior of the space surrounded by the canway into zones of various degrees of heat.

8. In combination a tank having inlet and outlet openings, a spiral canway in said tank, and a rotary reel within the spiral canway and coacting therewith for moving cans therethrough and partitions within and moving with the reel for dividing the interior of the space surrounded by the canway into zones of various degrees of heat, and means for maintaining said zones at different temperatures.

9. In combination a tank having an inlet and an outlet, a single spirally trending canway in said tank for directing cans from the inlet to the outlet, a single rotary carrier extending through the spirally trending canway and coacting therewith for moving cans therethrough, and partitions secured in and moving with the carrier dividing the interior of the space surrounded by the canway into zones of various degrees of heat.

10. In combination a tank having an inlet and an outlet, a single spirally trending canway in said tank for directing cans from the inlet to the outlet, a single rotary carrier extending through the spirally trending canway and cocating therewith for moving cans therethrough, and partitions secured in and moving with the carrier dividing the interior of the space surrounded by the canway into zones of various degrees of heat, and means for maintaining said zones at different temperatures.

11. In combination a tank having inlet and outlet openings and a plurality of heating zones, a spiral canway in said tank, a rotary carrier within the spiral canway and coacting therewith for moving cans therethrough, and means forming part of and moving with the carrier for preserving different degrees of heat in the several heating zones.

In testimony that I claim the foregoing as my own, I affix my signature.

ALBERT R. THOMPSON.